United States Patent
Wallis et al.

(10) Patent No.: US 9,837,849 B2
(45) Date of Patent: Dec. 5, 2017

(54) ULTRASONIC CHARGING APPARATUS, SYSTEM AND METHOD

(71) Applicant: MOTOROLA SOLUTIONS, INC, Schaumburg, IL (US)

(72) Inventors: David W. Wallis, Atlanta, GA (US); John E. Herrmann, Suwanee, GA (US); Mark C. Taraboulos, Dunwoody, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 125 days.

(21) Appl. No.: 14/839,102

(22) Filed: Aug. 28, 2015

(65) Prior Publication Data
US 2017/0063129 A1 Mar. 2, 2017

(51) Int. Cl.
*H02J 7/00* (2006.01)
*H02J 7/02* (2016.01)
*H02J 50/15* (2016.01)

(52) U.S. Cl.
CPC ............ *H02J 7/025* (2013.01); *H02J 7/0042* (2013.01); *H02J 7/0052* (2013.01); *H02J 50/15* (2016.02); *H02J 2007/0059* (2013.01)

(58) Field of Classification Search
USPC .......................................................... 320/108
See application file for complete search history.

(56) References Cited

U.S. PATENT DOCUMENTS

| 4,439,497 | A | 3/1984 | DiFoggio | |
|---|---|---|---|---|
| 9,001,622 | B2* | 4/2015 | Perry | H04B 11/00 320/107 |
| 2012/0300592 | A1* | 11/2012 | Perry | H04B 11/00 367/180 |
| 2015/0280484 | A1* | 10/2015 | Radziemski | H02J 7/025 320/108 |

* cited by examiner

Primary Examiner — Mohammed Alam
(74) Attorney, Agent, or Firm — Barbara R. Doutre

(57) ABSTRACT

A charging apparatus (102), system (100) and method (500) are provided for charging and/or powering a wearable electronic device, such as electronic eyeglasses. The charging apparatus comprises an acoustic horn, a piezoelectric transducer, and charger circuitry for converting ultrasonic waves received at the horn into a charging signal. The charging signal is used for charging and/or powering the wearable electronic device while the device is being worn.

10 Claims, 5 Drawing Sheets

ULTRASONIC CHARGING APPARATUS, SYSTEM AND METHOD

FIELD OF THE DISCLOSURE

The present disclosure relates generally to wearable electronic devices, and more particularly to the charging and/or powering of wearable electronic devices.

BACKGROUND

The charging of wearable electronic devices can be cumbersome. In most cases, the wearable device must be removed from the user in order to charge the device, disrupting device usage. Wireless charging that is transparent to the user would be especially beneficial in such cases. Wireless charging typically utilizes a receive coil housed within the device to be charged. However, the receive coil for many body worn, portable electronic devices would need to be prohibitively large to ensure efficient power transfer. Smaller wearable electronic devices do not have the space to accommodate a large receive coil. Additionally, there are issues with efficiency and the amount of time a device will maintain a charge. For wearable devices that are used by public safety personnel working in the field, such as police officers, the device's ability to maintain a charge throughout a work shift is desirable so as not to have to return to a home base to replace or recharge the device.

Accordingly, it would be desirable to have an improved apparatus, system and method for charging and/or powering a wearable electronic device. An approach that would allow charging while the device is being worn would be particularly beneficial.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
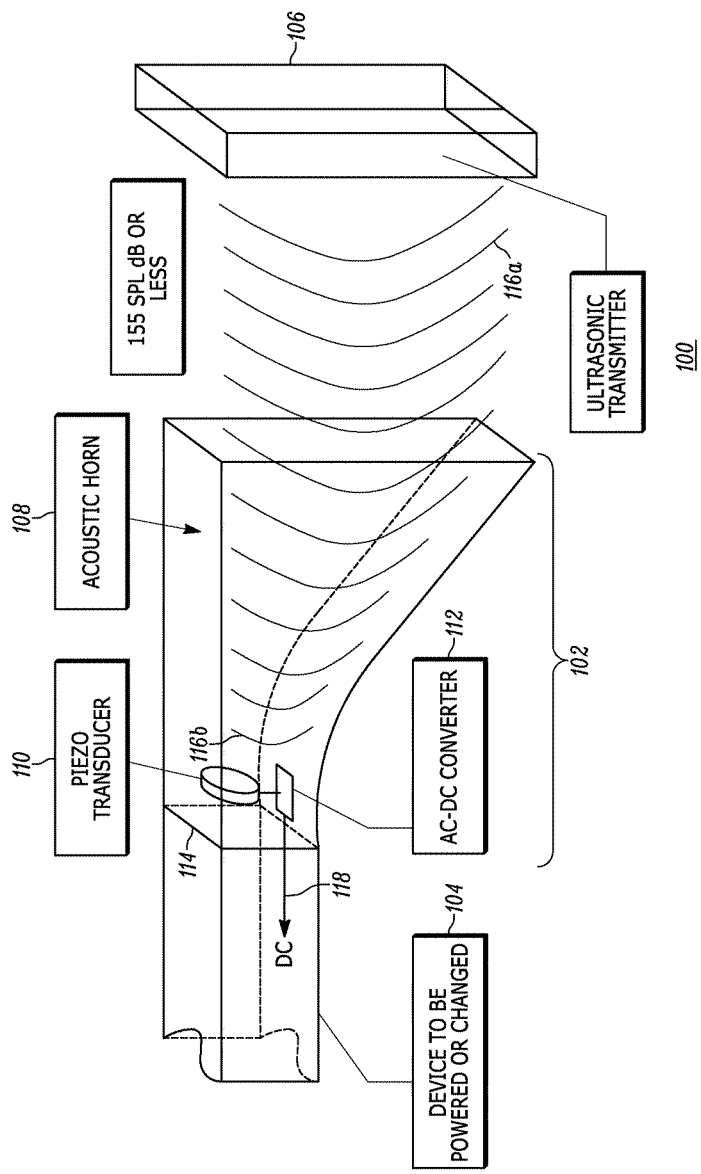
FIG. 1 is a block diagram of a charging system having a charging apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a charging apparatus and charging system formed and operating in accordance with various embodiments. The charging apparatus may be integrated as part of a wearable electronic device, such as electronic eyeglasses, or may be removably coupled to and from the wearable electronic device such as by direct connector coupling or via a cable. The charging apparatus comprises an acoustic horn, a piezoelectric transducer, and charger circuitry, such as an AC/DC converter. In accordance with the various embodiments, the charging apparatus coverts ultrasonic wave signals transmitted from a remote source into a charging signal. The remote source of the ultrasonic wave signals may be for example, ultrasonic wave signals generated from an ultrasonic transmitter integrated within a vehicular system.

The wearable electronic device having the charging apparatus integrated therein or coupled thereto can advantageously be worn while the wearable electronic device is being operated and charged by the charging system. Embodiments for charging a battery and/or powering the wearable electronic device are described as well as embodiments involving additional electronic devices attached through an interface cable. The charging apparatus, system and method are beneficial for charging and/or powering a wearable electronic device while the device is being worn within a vehicle, worn while seated in a chair or other location where the directed transmission of ultrasonic signals to the charging apparatus is feasible.

FIG. 1 is a block diagram of a charging system 100 in accordance with some embodiments. Charging system 100 comprises a charging apparatus 102, a wearable electronic device 104 (portion thereof shown) to be charged or powered, and a remote transmitter device comprising an ultrasonic transmitter 106. In accordance with some embodiments, the charging apparatus 102 comprises an acoustic horn 108, a piezoelectric transducer 110, and an AC-DC converter 112. The piezoelectric transducer 110 is operatively coupled to the AC-DC converter 112. The piezoelectric transducer 110 and AC-DC converter 112 may be located at an output end 114 of the acoustic horn 108, or alternatively integrated within the wearable electronic device 104 to align with the output end 114 of the acoustic horn 108.

The ultrasonic transmitter 106 may be located in a vehicle, such as in a shoulder rest, or neck rest area, or even a chair within an office. In accordance with some embodiments, the ultrasonic transmitter 106 generates ultrasonic waves 116a, and the charging apparatus 102 converts received ultrasonic waves 116a into a DC signal 118 for powering and/or charging the wearable electronic device 104.

In more detailed operation, the ultrasonic transmitter 106 transmits the ultrasonic waves 116a, for example at levels of 155 SPL dB or less, and the acoustic horn 108 receives the ultrasonic waves 116a at the horn's larger input opening. The acoustic horn 108 generates a concentrated ultrasonic signal 116b as an output which is directed into the piezoelectric transducer 110. The piezoelectric transducer 110 converts the concentrated ultrasonic signal 116b into an AC signal. The AC signal is converted to a DC signal through AC-DC converter 112 coupled to the piezoelectric transducer 110. The DC signal 118 is used to charge a battery and/or power the wearable electronic device 104.

The charging apparatus 102 maybe integrated as part of the wearable electronic device 104 or removably coupled to the electronic device, such as by an interface connector or electronic cable, to be described later. The acoustic horn 108 may be formed of thermo, thermoset plastic or metal or similar type materials and can be easily dimensioned to fit to wearable communication devices, such as the arms of eyeglasses, headsets, remote speaker microphone (RSM), and remote sensors.

Figure 2:
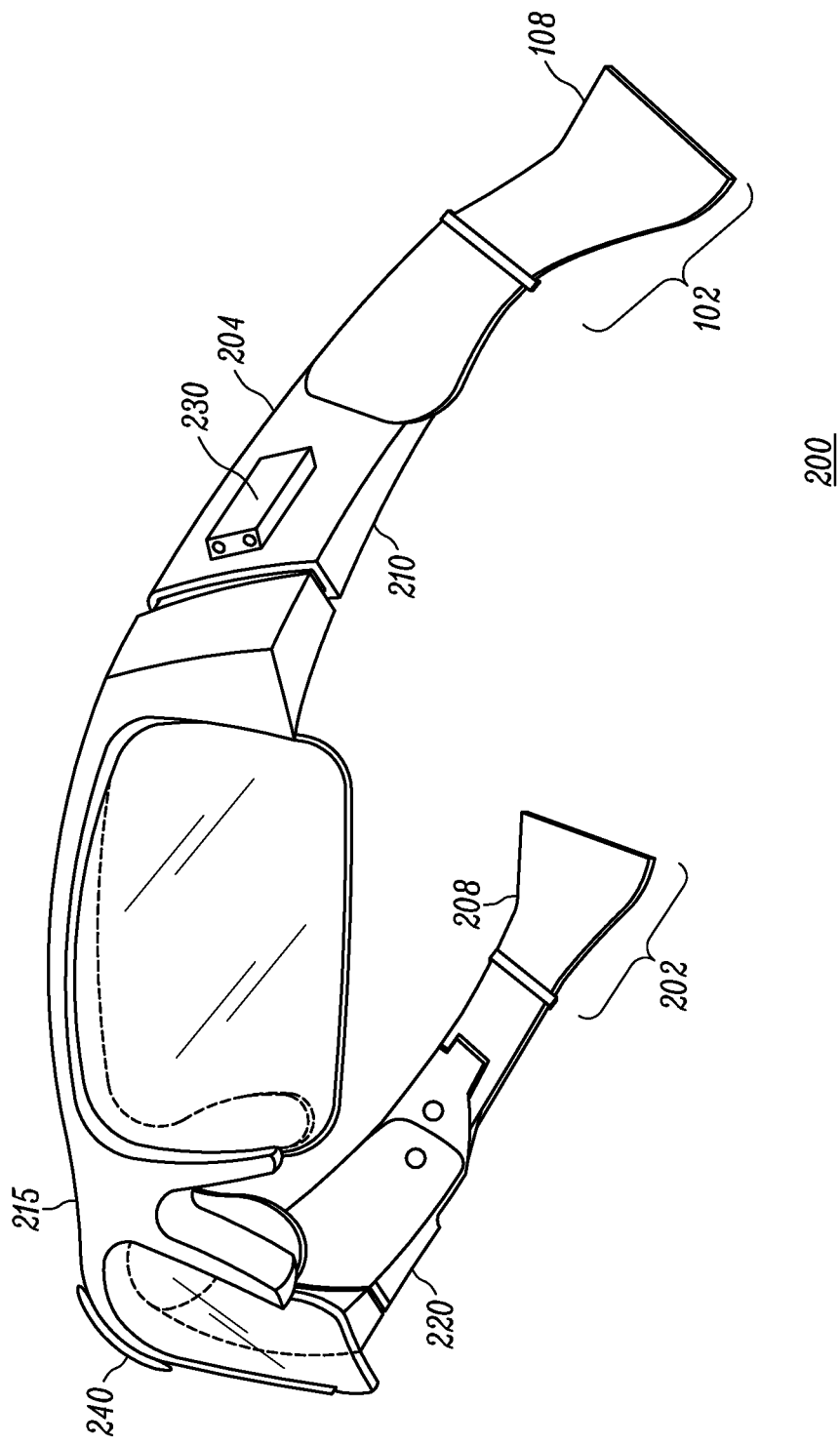
FIG. 2 is an example of a usage application for the charger apparatus incorporated into a wearable electronic device in accordance with some embodiments.

FIG. 2 provides an example of a usage application 200 for the charger system 100 where the wearable electronic device 104 of FIG. 1 is embodied in the form of electronic eyeglasses 204 formed and operating in accordance with some embodiments. Electronic eyeglasses having two arms 210, 220 coupled by a face bridge 215 provide the opportunity for one or more charging apparatus, here shown as first charging apparatus 102 and second charging apparatus 202 coupled respectively to arms 210, 220. Electronic eyeglasses comprising two charging apparatuses 102, 202 can be useful for applications where the electronics of the eyeglasses support, for example, two electronic devices such as a camera 230 and wireless push-to-talk (PTT) 240. Electronic eyeglasses may support a plurality of different wearable electronic accessories for example on-body sensors, and/or a wearable microphone to name a few.

In accordance with some embodiments, first charging apparatus 102 comprises acoustic horn 108, and second charging apparatus 202 comprises acoustic horn 208. The piezoelectric transducer and AC-DC converter (not shown) of each charging apparatus 102, 202 can be integrated within the respective acoustic horns 108, 208 or integrated within the respective arms 210, 220 of the electronic eyeglasses 204.

Additional charger circuitry may further comprise, for example, matching circuitry, and rectifier filters, as known in the charging art, under control of a controller. This charger circuitry is preferably located in the arms 210, 220, bridge 215 of eyeglasses 204 so as to keep a minimum number of components within the acoustic horns 108, 208 thereby maintaining a clear directional path for transmission of ultrasonic waves therethrough. However, as mentioned previously, the piezoelectric transducer(s) and AC-DC converter(s) can be readily integrated within the acoustic horn(s) if desired, advantageously providing a standalone product for portability.

Figure 3:
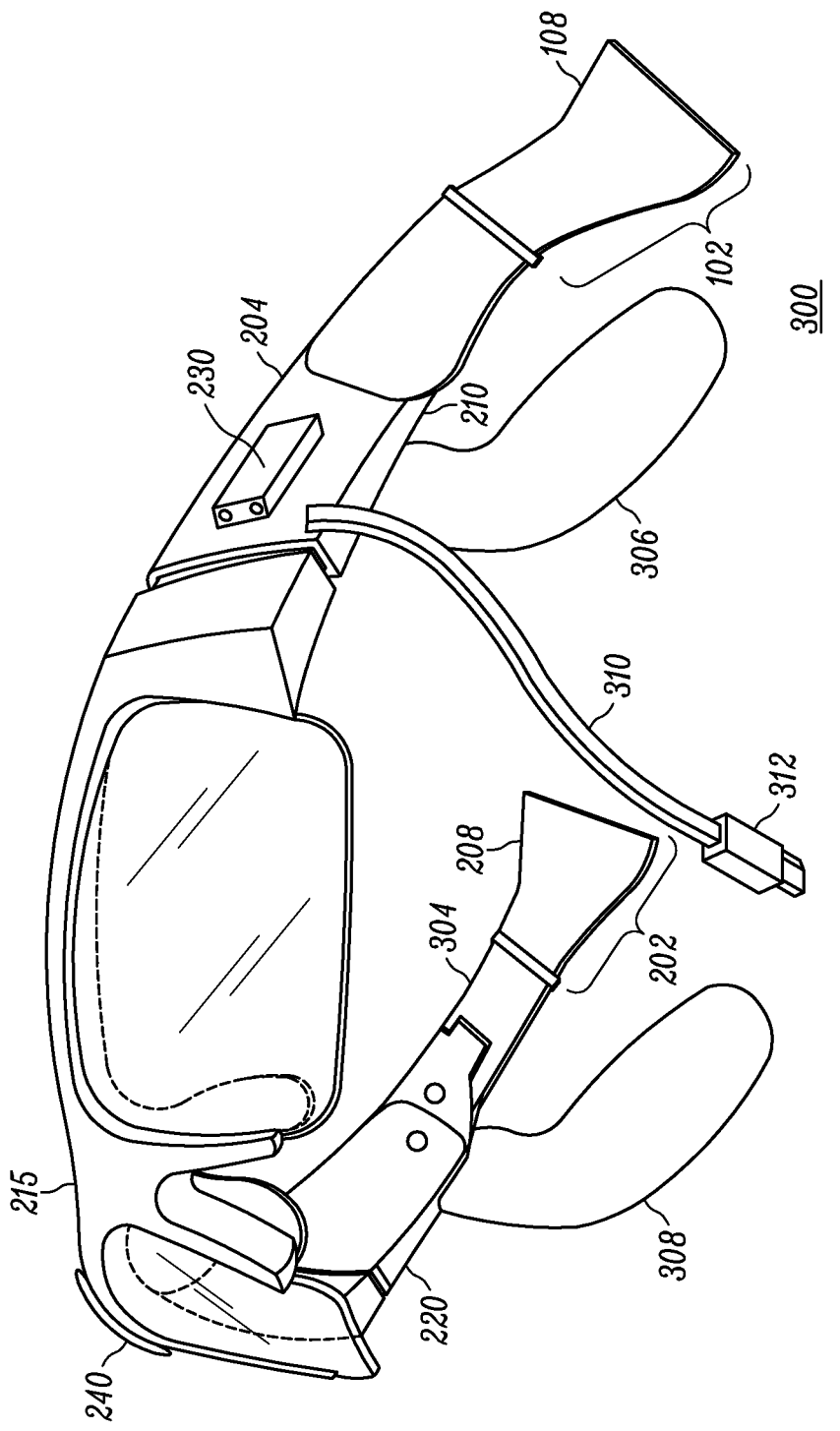
FIG. 3 extends the usage application of for the charger apparatus with the addition of an interface cable for charging and/or powering additional electronic devices that may be coupled to the wearable electronic device in accordance with some embodiments.

FIG. 3 extends the usage application of the charger apparatus 102 with the addition of an interface cable 310 for charging and/or powering additional electronic devices that may be coupled to the wearable host device, shown here as electronic eyeglasses 204 of FIG. 2. The charging circuitry (shown in FIG. 1) within the eyeglasses 204 may comprises the piezoelectric transducer 110 coupled to the AC-DC converter 112 to generate at least one of: a charging signal 118 for the battery; and an auxiliary DC source for powering other electronic devices 314 coupled to the eyeglasses 204.

Interface cable 310 comprises an interconnect 312 to transfer a power signal generated by the charging circuitry to other electronic devices 314 coupled to the electronic eyeglasses 304. Interconnect 312 may be a USB interconnect for further transferring serial bus interface communication signals between the host device and the other electronic devices 314. For example, a plurality of other electronic devices 314 may comprise on-body sensors, a wired push-to-talk (PTT), and a remote speaker microphone.

In this embodiment, electronic eyeglasses having two arms 210, 220 coupled by a face bridge 215 provides the opportunity for the additional charging apparatus 202 to be added on the second arm 220 as previously described. One or more ultrasonic transmitters, such as ultrasonic transmitter 106 of FIG. 1, may be used to generate the ultrasonic wave input to the horns 106, 208. Ultrasonic absorber element (s) 306, 306 may also be provided, if desired, for improved signal directivity and adjustment, and absorption of misdirected of the ultrasonic wave signals into each acoustic horn.

Figure 4:
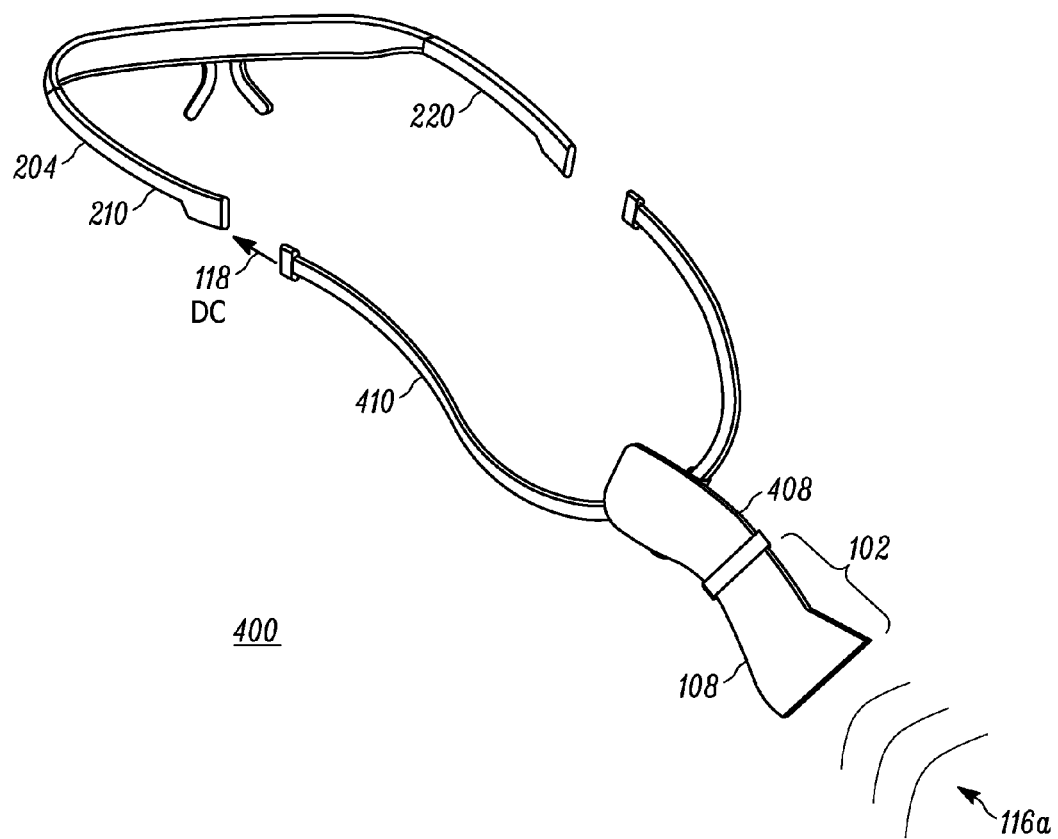
FIG. 4 is another example of a usage application in which the charger apparatus is detachable from the wearable electronic device in accordance with some embodiments.

FIG. 4 is an example of a usage application 400 for the charger system 100 where the wearable electronic device 104 is embodied in the form of electronic eyeglasses 204 formed and operating in accordance with some embodiments. In this example, an electronic cable 410 having charging apparatus 102 is provided. The electronic cable 410 is removably coupled between first and second arms 210, 220 of the electronic eyeglasses 204. The acoustic horn 108 and the piezoelectric receive transducer (shown in FIG. 1) are coupled to the electronic eyeglasses via the electronic cable 410. The AC-DC converter (shown in FIG. 1) may be integrated or coupled at interface 408 to provide a DC charging signal 118 to the electronic eyeglasses 204 in response to received ultrasonic waves 116a entering the acoustic horn 108. The electronic cable 410 is removably coupled to the electronic eyeglasses 204. The electronic cable 410 provides charging to a battery of the eyeglasses 204 and/or powering to electronic devices integrated therein or coupled thereto, such as for example a camera or PTT.

All embodiments allow for charging and powering at the same time while the device is being worn. The ultrasonic transmitter of FIG. 1 integrated into a vehicle, chair or other stationary device relative to the horn input provides sufficient alignment for the incoming signals ultrasonic signals.

The integration or coupling of the acoustic horn 108 to the wearable electronic device is beneficial to achieving a body worn approach. The electronic eyeglasses, for example, can now be charged while being worn on the body and driving a vehicle or sitting in a chair without having to remove the glasses to place them in a charging cradle.

Non-vehicular examples of ultrasonic transmitter source locations, such as an overhead lamp, under table and chair having the ultrasonic source may also make use of the various embodiments of the invention.

Figure 5:
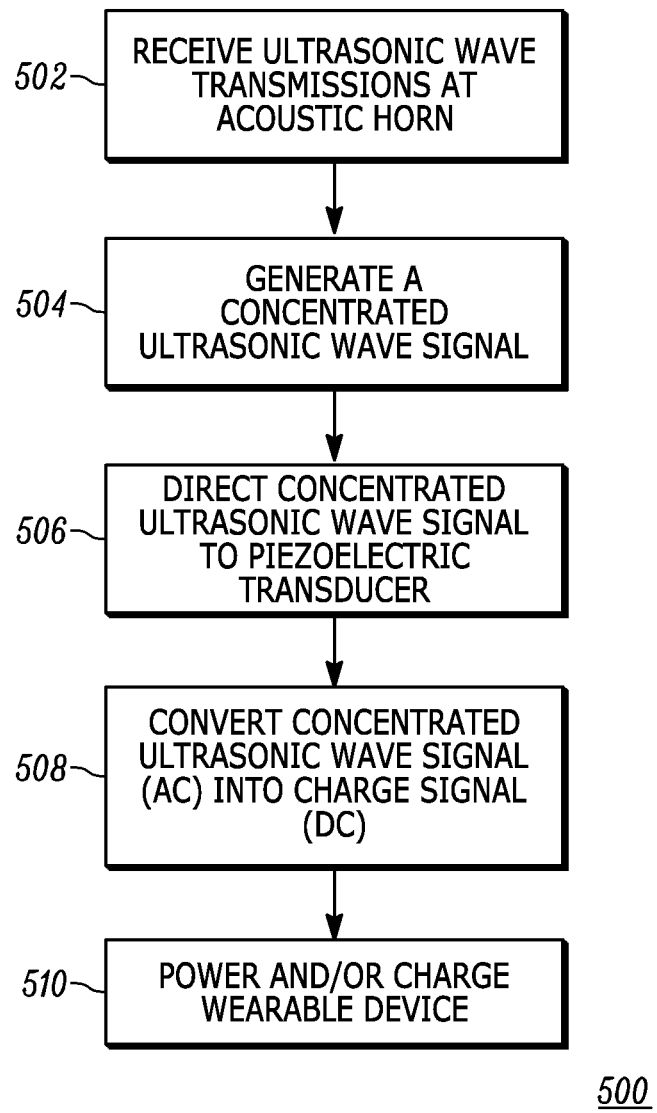
FIG. 5 is a method of charging and powering a wearable electronic device in accordance with some embodiments.

A flowchart shown in FIG. 5 describes a method 500 of charging and/or powering a wearable electronic device in accordance with some of the embodiments. Method 500 begins by receiving ultrasonic wave transmissions at an acoustic horn coupled to the electronic device at 502. The acoustic horn may be built into the electronic device or removably coupled (attachable/detachable) to the electronic device via connector or electronic cable. The ultrasonic waves may be generated from a remote transmitter device, for example located in a vehicle.

At 504, the received ultrasonic waves are directed via the acoustic horn to a piezoelectric transducer to generate a concentrated ultrasonic wave signal. The piezoelectric transducer may be integrated within the electronic device or within the acoustic itself. At 506, the concentrated ultrasonic wave signal is converted into a charging signal through charger circuitry followed by charging a battery coupled to the electronic device via the charging signal at 508 and powering the electronic device with the charged battery at 510.

The charging system operating under method 500 may further provide adjusting the positioning of the acoustic horn for alignment with the remote ultrasonic transmitter, and in some embodiments may further provide adjusting positioning of the remote ultrasonic transmitter for alignment with the acoustic horn. Frequency adjustments of the ultrasonic waves generated by the remote ultrasonic transmitter may be accomplished via a feedback link from the receive transducer (for example an RF feedback link, an AC signal feedback from the piezoelectric device, a BLUETOOTH feedback link, ultrasonic feedback link, to name a few) to control the frequency of the transmitter to maximize or reduce the power output of the transmitter as needed.

Wearable electronic devices such as, but not limited to, electronic eyeglasses, ear pieces, headsets and electronic helmets can all benefit from the charging apparatus, method and system provided by the various embodiments. The charging apparatus, system and method facilitate wireless power transfer to a wearable electronic device(s) which is particularly advantageous in the public safety arena. The use of an acoustic horn with piezoelectric transducer and charge circuitry to generate a charging signal from ultrasonic waves provides a new approach to medium distance wireless charging on the order of several feet. The charger apparatus having acoustic horn facilitates the ability to charge a plurality of different wearable electronic devices, such as electronic eyeglasses, headsets and other wearable devices. The charger system, embodied within a vehicular environment, is ideal for public safety personnel in that the system allows charging, powering and usage of the wearable electronic device while driving. There is no need to return or exchange electronic eyeglasses to a home station for charging.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method of charging a wearable electronic device, comprising:
  receiving ultrasonic wave transmissions at an acoustic horn, the acoustic horn being electrically and mechanically coupled to the wearable electronic device;

generating a concentrated ultrasonic wave signal within the acoustic horn;

directing the concentrated ultrasonic wave signal to a piezoelectric transducer and an AC-DC converter located within the acoustic horn to convert the concentrated ultrasonic wave signal into a charging signal;

charging a battery coupled to the wearable electronic device via the charging signal while the wearable electronic device is being worn; and powering the wearable electronic device with the charged battery.

2. The method of claim 1, further comprising, prior to receiving the ultrasonic wave transmissions:

transmitting ultrasonic waves from a remote ultrasonic transmitter.

3. The method of claim 2, wherein the remote ultrasonic transmitter is located in one of: a vehicle, a lamp, a table and a chair.

4. The method of claim 2, further comprising one or more of:

adjusting positioning of the acoustic horn for alignment with the remote ultrasonic transmitter; and adjusting positioning of the remote ultrasonic transmitter for alignment with the acoustic horn.

5. The method of claim 2, further comprising:

adjusting a frequency of the transmitted ultrasonic waves generated by the remote ultrasonic transmitter via a feedback link of the receive transducer.

6. The method of claim 1, wherein the acoustic horn is integrated into the electronic device.

7. The method of claim 1, wherein the acoustic horn is attachable to and detachable from the electronic device.

8. The method of claim 7, further comprising:

attaching the acoustic horn to the electronic device prior to charging.

9. The method of claim 1, further comprising:

wearing the electronic device while the battery of the electronic device is being charged.

10. The method of claim 1, wherein the ultrasonic wave transmissions are received at a larger input opening of the acoustic horn, and the piezoelectric transducer and AC-DC converter are located at an output end of the acoustic horn.

* * * * *